United States Patent
Tseng

(10) Patent No.: US 9,227,693 B2
(45) Date of Patent: Jan. 5, 2016

(54) AUXILIARY DEVICE FOR HYDRAULIC BRAKE ASSEMBLY

(71) Applicant: Ansure, Inc., New Taipei (TW)

(72) Inventor: Ton-Rong Tseng, New Taipei (TW)

(73) Assignee: Ansure, Inc., New Taipei (TW)

( * ) Notice: Subject to any disclaimer, the term of this patent is extended or adjusted under 35 U.S.C. 154(b) by 12 days.

(21) Appl. No.: 14/156,660

(22) Filed: Jan. 16, 2014

(65) Prior Publication Data

US 2015/0197310 A1    Jul. 16, 2015

(51) Int. Cl.
  *F04B 49/06*    (2006.01)
  *B62L 3/08*     (2006.01)
  *B62L 3/02*     (2006.01)

(52) U.S. Cl.
  CPC . *B62L 3/08* (2013.01); *B62L 3/023* (2013.01); *F04B 49/06* (2013.01)

(58) Field of Classification Search
  CPC ............ B64C 11/40; B62L 3/08; B60T 8/40; B60T 11/06; B60T 13/68; F04B 49/06; B60K 6/00; B60K 6/12
  USPC ....... 303/10, 116.4; 188/24.11–24.22, 151 R, 188/344; 417/216, 223, 273; 60/533
  See application file for complete search history.

(56) References Cited

U.S. PATENT DOCUMENTS

| | | | | |
|---|---|---|---|---|
| 2,773,452 A * | 12/1956 | Berninger et al. | ............ | 417/216 |
| 5,152,675 A * | 10/1992 | Morris | ............ | 417/343 |
| 5,435,637 A * | 7/1995 | Harada et al. | ............. | 303/116.4 |
| 6,065,816 A * | 5/2000 | Nakazawa | ................ | 303/116.4 |
| 6,092,993 A * | 7/2000 | Young et al. | ................ | 417/53 |
| 6,446,435 B1* | 9/2002 | Willmann et al. | ............. | 60/533 |
| 8,261,887 B2* | 9/2012 | Tseng | ........................ | 188/24.22 |
| 8,469,156 B2* | 6/2013 | Lu et al. | ..................... | 188/24.22 |
| 2004/0219031 A1* | 11/2004 | Morelli | ........................ | 417/273 |
| 2010/0296948 A1* | 11/2010 | Kuttler et al. | ................... | 417/53 |

* cited by examiner

*Primary Examiner* — Christopher Schwartz

(74) *Attorney, Agent, or Firm* — C. G. Mersereau; Nikolai & Mersereau, P.A.

(57) ABSTRACT

An auxiliary device for a hydraulic brake assembly used on a two-wheel vehicle includes a body and a transmission device. The body has four cylinders respectively connected to the left and right brake lever hoses, and front and rear wheel brake hoses. By the operation of the transmission device, the front and the rear wheels are braked by either pulling the left brake lever or the right brake lever. The front wheel brake unit and the rear wheel brake unit are simultaneously activated by pulling either the left brake lever or the right break lever. The front wheel is braked right after the rear wheel is braked, and the braking force applied to the rear wheel is larger than that to the front wheel.

13 Claims, 15 Drawing Sheets

AUXILIARY DEVICE FOR HYDRAULIC BRAKE ASSEMBLY

BACKGROUND OF THE INVENTION (1) Field of the Invention

The present invention relates to an auxiliary device for a brake assembly, and more particularly, to auxiliary device for a hydraulic brake assembly of a two-wheel vehicle to simultaneously activate the front and rear wheel brake units and control the difference of the braking pressures of the front and rear wheels.

(2) Description of Related Art

For two-wheel vehicles, such as bicycles or motorbikes, are used widely as a convenient transportation tool. In order to increase the efficiency of braking feature, the hydraulic brake assembly is developed and becomes the main trend of the brake systems.

The conventional brake assembly for two-wheel vehicles uses the left brake lever and the right brake lever to respectively brake the front wheel and the rear wheel. However, some of the riders may brake the front wheel or the rear wheel too much so that the front or rear wheel is locked when in urgent situations, this situation may cause the rider and the bicycle to flip over or slip aside, and the rider or people beside the rider may be injured. Preferably, when braking the bicycle, the rear wheel is first braked and the front wheel is then braked. Preferably, 30% of the braking force is applied to the front wheel and 70% of the braking force is applied to the rear wheel.

The hydraulic brake assembly has higher efficiency than the conventional brake assembly, especially for those high-end bicycles and motorbikes, a reliable and high performance brake assembly is required. However, when in urgent situations, such as moving downward at high speed, the improper operation to the hydraulic brake assembly, such as the braking force to the rear wheel is larger than that to the front wheel, may cause damage to the bicycle or motorbike, and the rider.

The present invention intends to provide an auxiliary device for a hydraulic brake assembly which improves the shortcomings mentioned above.

SUMMARY OF THE INVENTION

The present invention relates to an auxiliary device for a hydraulic brake assembly and comprises a body having four cylinders located between the top and the bottom thereof, each of the four cylinders has a movable unit. The movable unit has its first end located in the cylinder, and the second end protruding beyond the first end of the cylinder and each of the movable units is movable relative to the cylinder axially. A transmission device is extends through the body and has two first operation ends and two second operation ends, the two first operation ends and the two second operation ends are respectively located on movement tracks of the four movable units and contact the four movable units. When the movable unit drives one of the first operation ends located corresponding thereto, the two movable units located corresponding to the second operation ends are moved by the transmission device.

Preferably, the movable unit has a piston and a piston rod. The piston is movably located in the cylinder corresponding thereto, and the piston rod has the first end thereof connected to the piston, and the second end protruding beyond the first end of the cylinder and contacting one of the first operation ends, or one of the second operation ends of the transmission device. By the cooperation of the pistons and the piston rods, the present invention can control the braking actions.

Preferably, the left brake lever hose and the right brake lever hose are respectively connected to two respective second ends of the cylinders located corresponding to the two first operation ends. The front wheel brake hose and the rear wheel brake hose are respectively connected to two respective second ends of the cylinders located corresponding to the two second operation ends.

Preferably, the diameter of the cylinder connected to the rear wheel brake hose is larger than the diameter of the cylinder connected with the front wheel brake hose.

Preferably, the piston rods protruding from the cylinders are located on one side of the body, and a connection portion is connected to the side of the body so as to be connected with the transmission device.

Preferably, the transmission device has a positioning rod, a first link and a second link. The positioning rod extends through the connection portion and is rotatable along the axis thereof. The first and second links respectively extend through the positioning rods. The two first operation ends are located on two respective first ends of the first and second links, the two second operation ends are located on two respective second ends of the first and second links.

Preferably, the transmission device has a positioning rod, a first link and a second link. The central portion of the positioning rod is connected to the connection portion. Two ends of the positioning rod are rotatable about the connection portion. The first and second links are respectively connected to the two ends of the positioning rod. The two first operation ends are located on two ends of the first link. The two second operation ends are located on two ends of the first and second link.

Preferably, the piston rods that are located corresponding to the two first operation ends protrude from the first side of the body. The piston rods that are located corresponding to the two second operation ends protrude from the second side of the body. The transmission device extends through the body, and the two first operation ends and the two second operation ends are respectively located on two opposite sides of the body.

Preferably, the transmission device has a positioning rod, a first link and a second link. The positioning rod extends through the body. The first and second links are respectively connected to two ends of the positioning rods. The two first operation ends are located on two ends of the first link. The two second operation ends are located on two ends of the second links.

The primary object of the present invention is to provide an auxiliary device for a hydraulic brake assembly. The front and wheel are braked by either pulling the left brake lever or the right brake lever.

Another object of the present invention is to provide an auxiliary device for a hydraulic brake assembly, wherein the force applied to the rear wheel is always larger than that to the front wheel.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
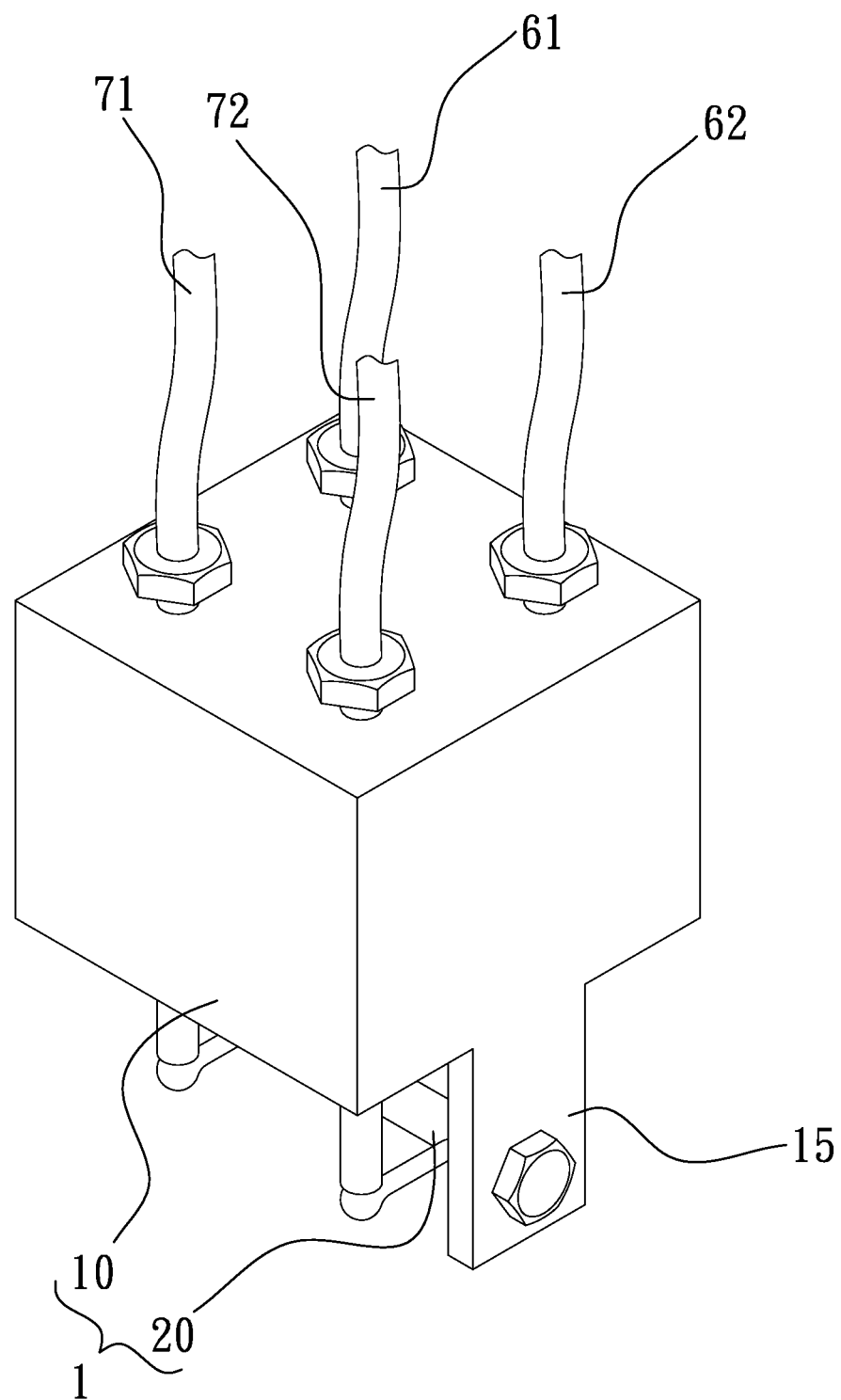
FIG. 1 is a perspective view to show the auxiliary device of the present invention.

Referring to FIGS. 1 to 6, the auxiliary device 1 of a hydraulic brake assembly for two-wheel vehicles of the present invention is connected to the left brake lever hose 61, the right brake lever hose 62, the front wheel brake hose 71 and the rear wheel brake hose 72 of the two-wheel vehicle. The auxiliary device 1 comprises a body 10 and a transmission device 20.

Figure 2:
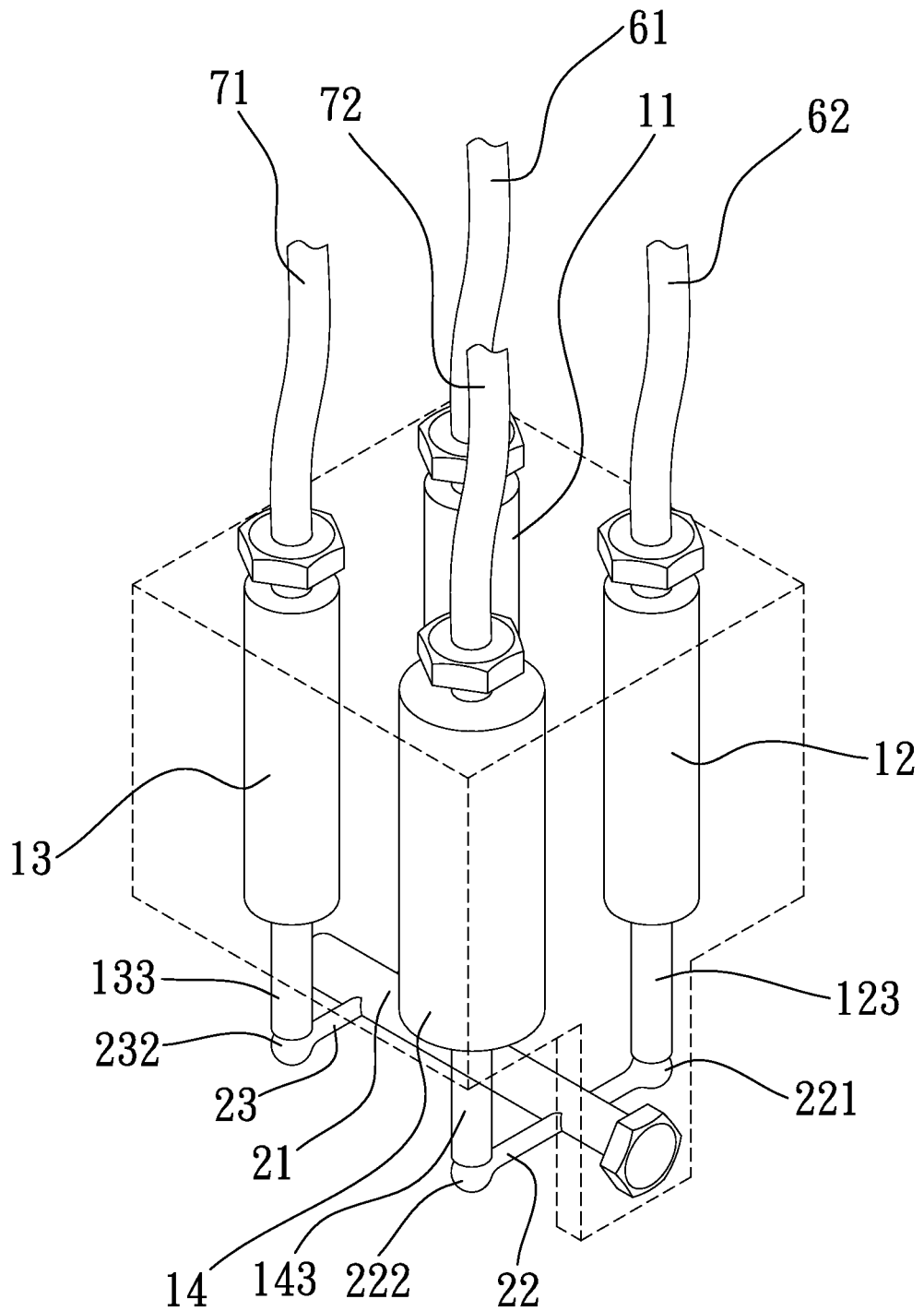
FIG. 2 shows the inside arrangement of the auxiliary device of the present invention.
Figure 3:
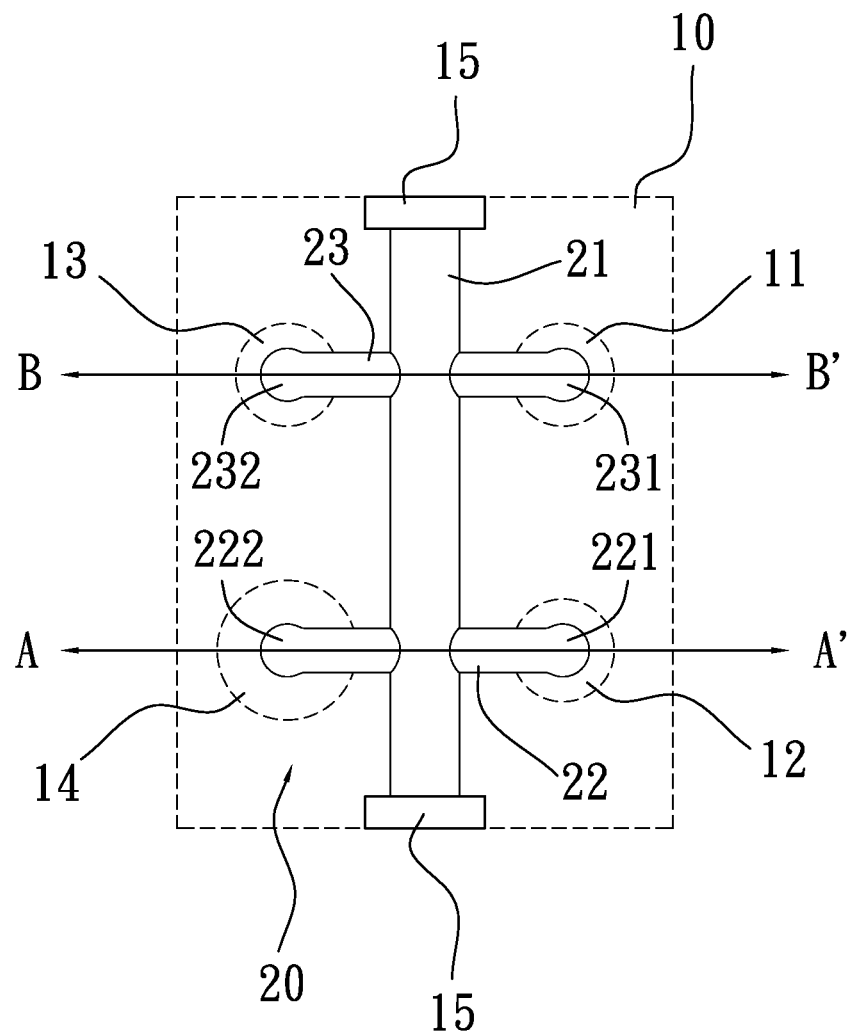
FIG. 3 is a top view to show the arrangement of the auxiliary device of the present invention.
Figure 4:
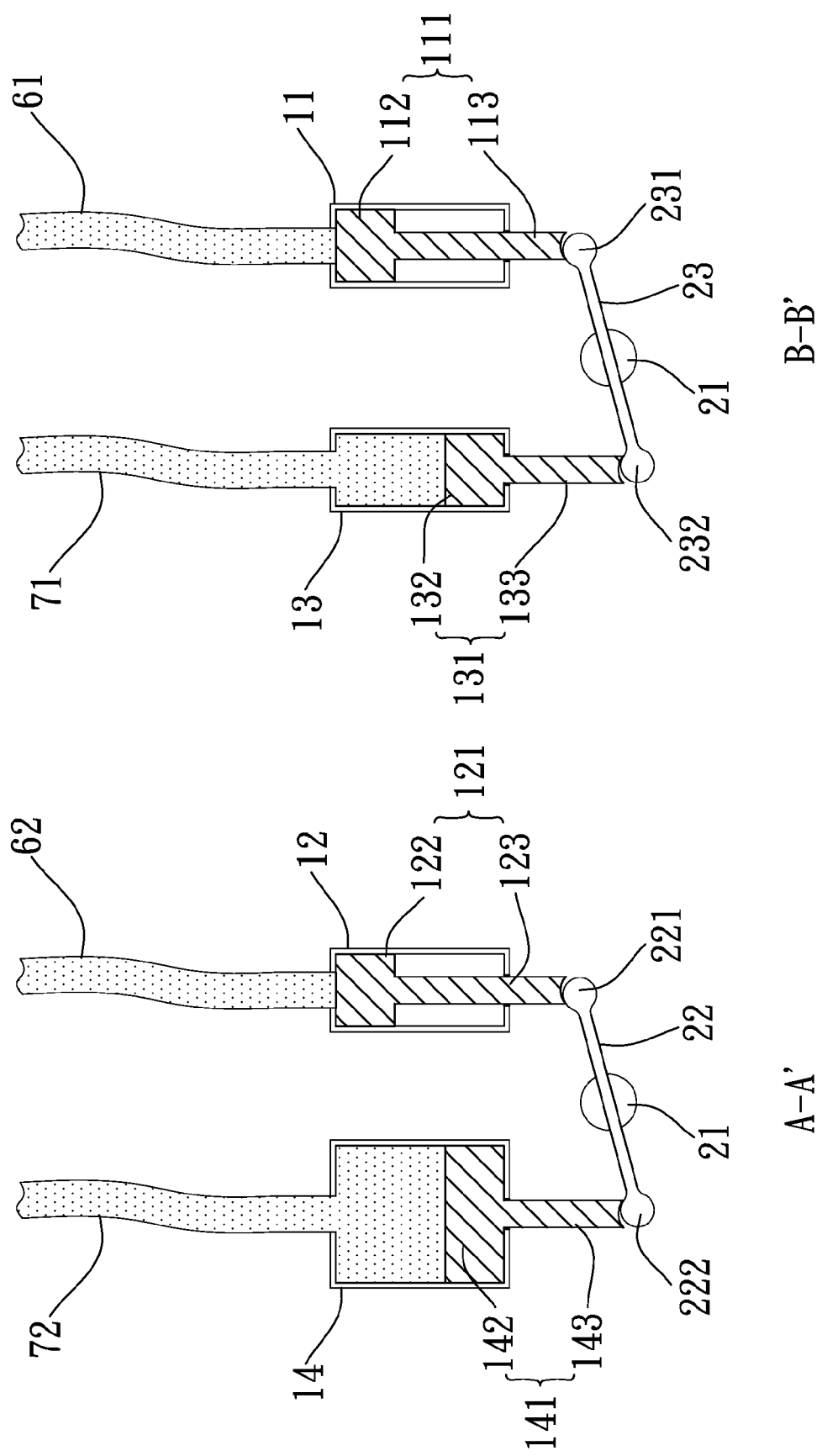
FIG. 4 is two cross sectional views respectively taking along lines A-A' and B-B' in FIG. 3, wherein no action is taken.

As shown in FIGS. 2 to 4, the body 10 is a rectangular body and has four cylinders 11, 12, 13, 14 located between the top and the bottom thereof. The four cylinders 11, 12, 13, 14 are respectively connected to the left brake lever hose 61, the right brake lever hose 62, the front wheel brake hose 71 and the rear wheel brake hose 72. Each of the four cylinders 11, 12, 13, 14 has a movable unit 111/121/131/141 which has a first end located in the cylinder 11/12/13/14 corresponding thereto, and a second end protruding beyond the first end of the cylinder 11/12/13/14 corresponding thereto. Each of the movable units 111, 121, 131, 141 is movable relative to the cylinder 11/12/13/14 corresponding thereto axially. The movable unit 111/121/131/141 has a piston 112/122/132/142 and a piston rod 113/123/133/143. The piston 112/122/132/142 is movably located in the cylinder 11/12/13/14 corresponding thereto, and the piston rod 113/123/133/143 has a first end connected to the piston 112/122/132/142, and a second end protruding beyond the first end of the cylinder 11/12/13/14.

The transmission device 20 is connected to the connection portion 15 on the bottom of the body 10, and comprises a positioning rod 21, a first link 22 and a second link 23. The positioning rod 21 extends through the connection portion 15 and is rotatable along the axis thereof. The first and second links 22, 23 respectively extend through the positioning rod 21, and are rotatable with the positioning rod 21. A first operation end 221 and a second operation end 222 are connected to the two ends of the first link 22, and are respectively located on the two movement tracks of the two piston rods 123, 143 connected to the two cylinders 12, 14 which are connected to the right brake lever hose 62 and the rear wheel brake hose 72. The other first operation end 231 and the other second operation end 232 are connected to the two ends of the second link 23, and are respectively located on the two movement tracks of the two piston rods 113, 133 connected to the two cylinders 11, 13 which are connected to the left brake lever hose 61 and the front wheel brake hose 71.

Figure 5:
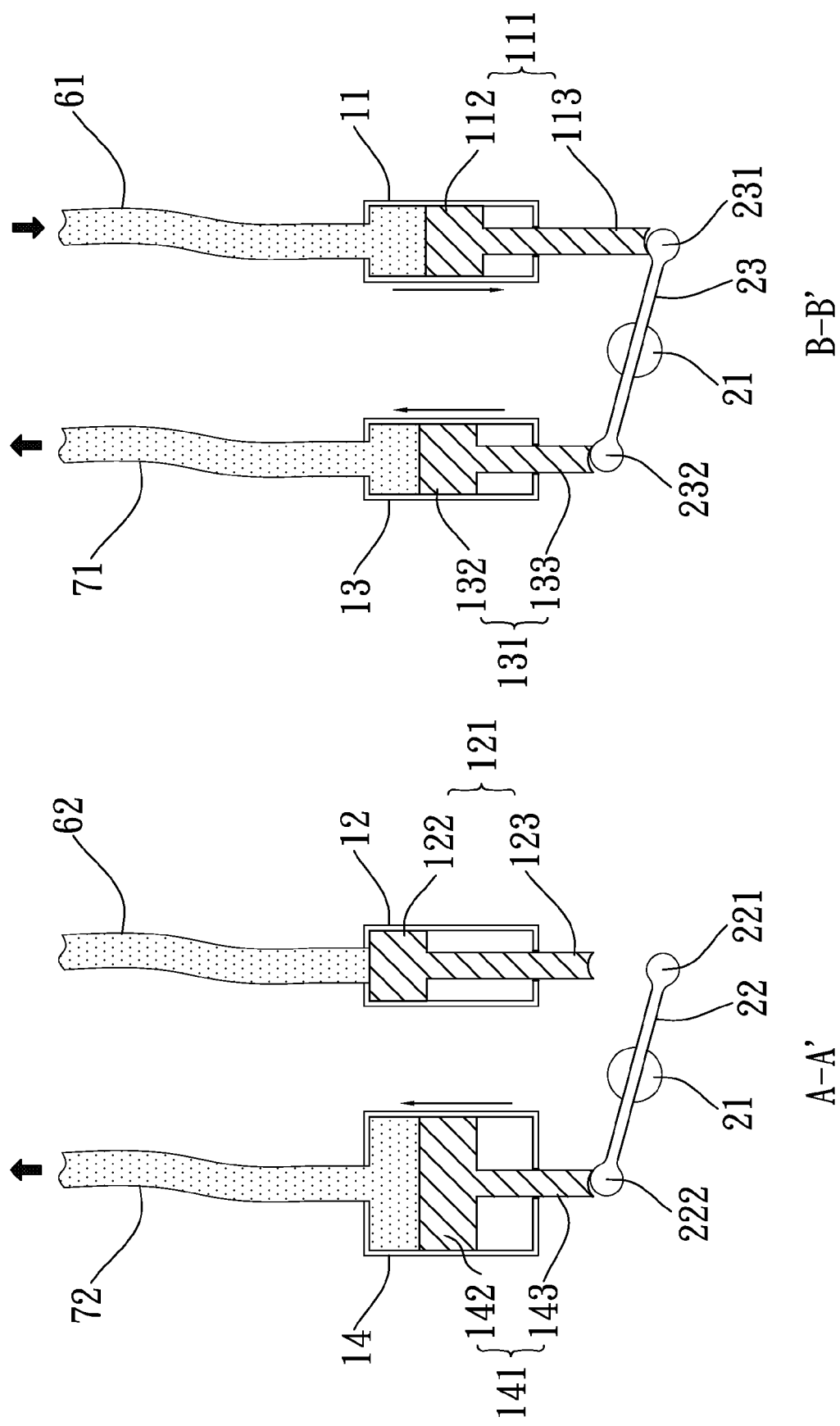
FIG. 5 is two cross sectional views respectively taking along lines A-A' and B-B' in FIG. 3, wherein the left brake lever is operated.
Figure 6:
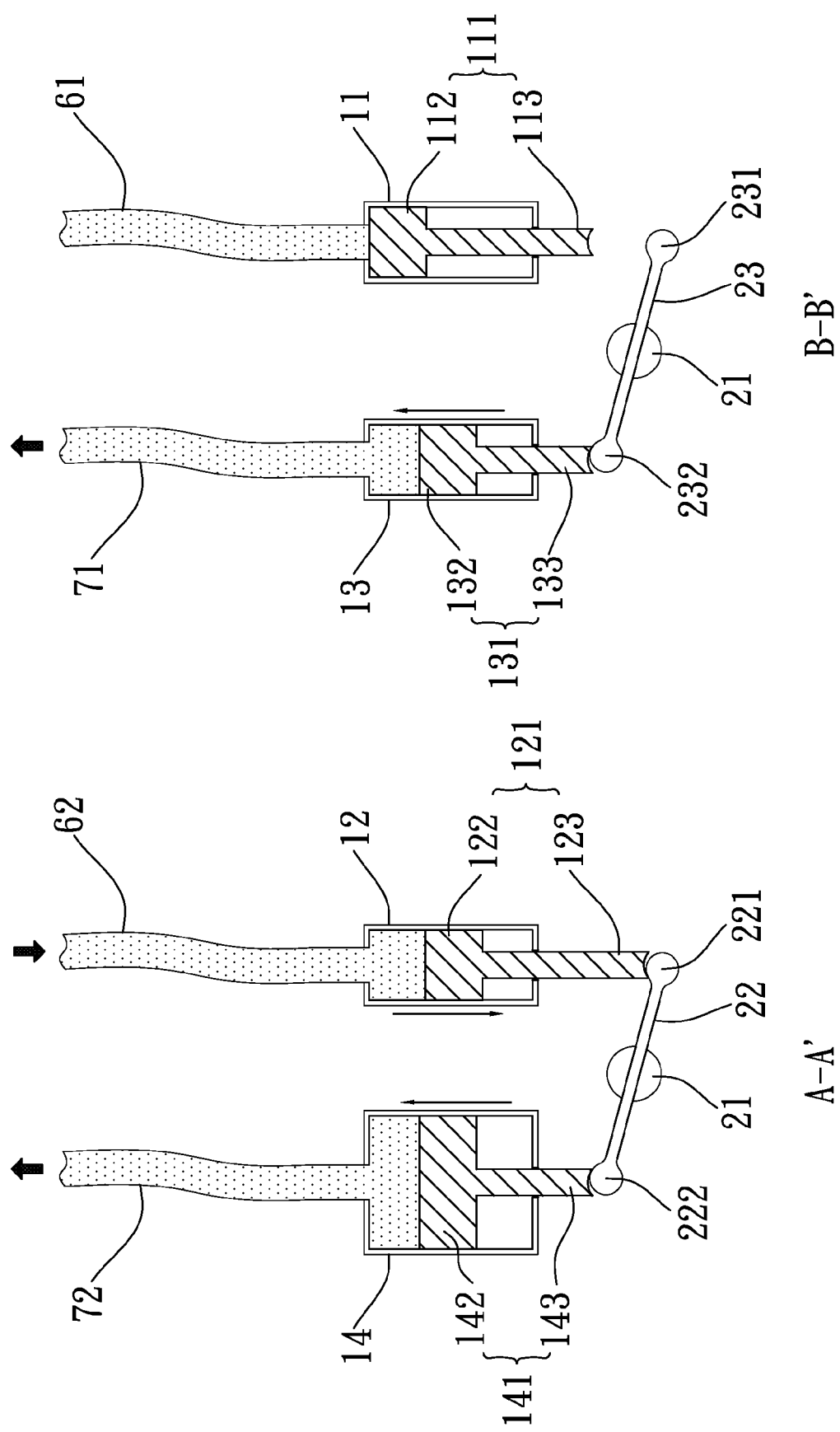
FIG. 6 is two cross sectional views respectively taking along lines A-A' and B-B' in FIG. 3, wherein the right brake lever is operated.
Figure 7:
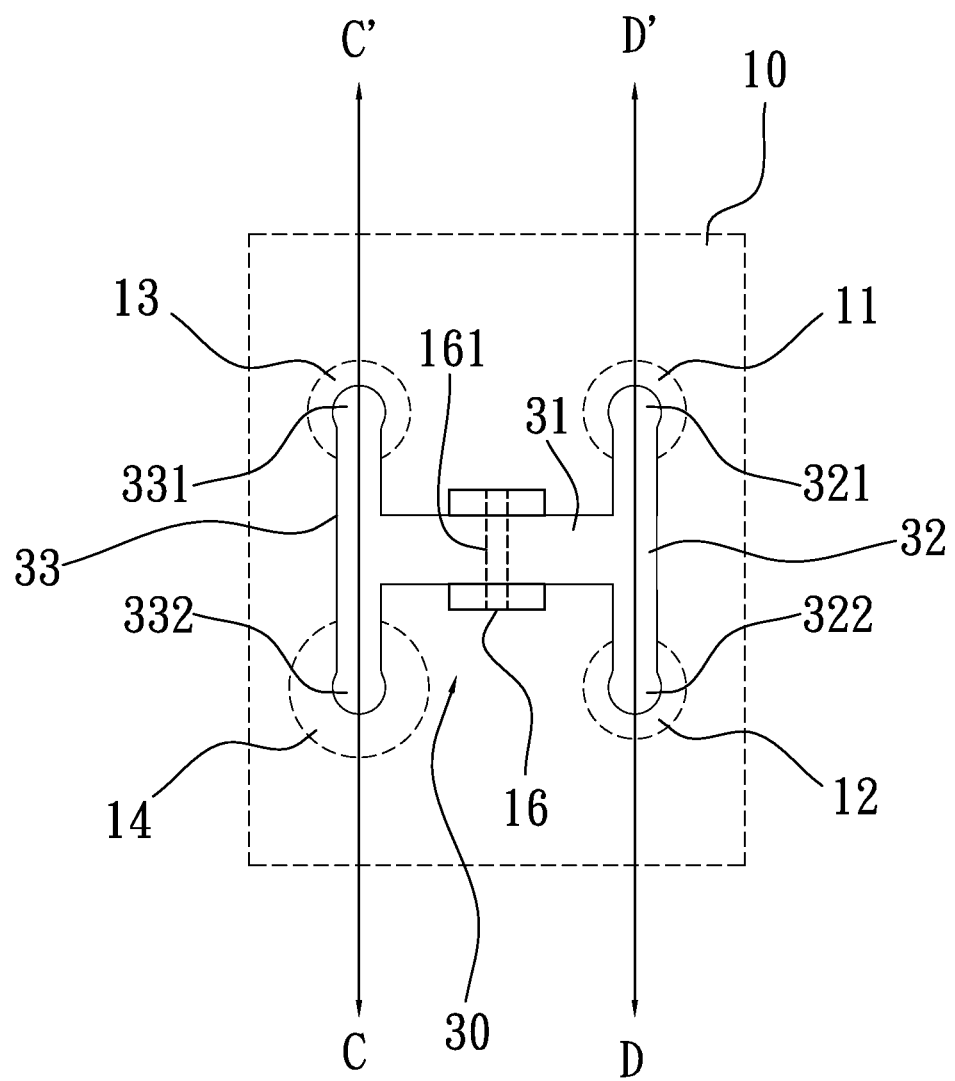
FIG. 7 is a top view to show the arrangement of the second embodiment of the auxiliary device of the present invention.

When the left and right brake lever hoses 61, 62 are not in action as shown in FIG. 4, the first operation ends 221, 231 contact the piston rods 123, 113, and the second operation ends 222, 232 contact the piston rods 143, 133. When only the left brake lever is pulled as shown in FIG. 5, the piston 112 and the piston rod 113 of the cylinder 11 are driven via the hydraulic power from the left brake lever hose 61, the second link 23 is pushed by the first operation end 231 and the positioning rod 21 is rotated so as to drive the second operation end 232 to push the piston rod 133. In the meanwhile, the first link 22 is activated by the positioning rod 21, and is rotated along with the second link 23 so that the second operation end 222 pushes the piston rod 143. The two piston rods 133, 143 move the pistons 132, 142 to drive the front wheel brake unit and the rear wheel brake unit via the front and rear wheel brake hoses 71, 72. Similarly, when only the right brake lever is pulled as shown in FIG. 6, the first link 22 rotates the positioning rod 21 and drives the second link 23 so as to drive the front wheel brake unit and the rear wheel brake unit via the front and rear wheel brake hoses 71, 72.

The present invention is easily operated and can activate the front wheel brake unit and the rear wheel brake unit by either pulling the left or right brake lever.

As shown in FIGS. 7 to 10, by different connection between the parts of the present invention, the same function is achieved. The transmission device 20 is replaced by the transmission device 30 which has a positioning rod 31, a first link 32 and a second link 33. The central portion of the positioning rod 31 is connected to the connection portion 16 located at the bottom of the body 10 and is secured by a positioning shaft 161, so that the positioning rod 31 is rotatable about the positioning shaft 161. The first and second links 32, 33 are respectively connected to the two ends of the positioning rod 31. The two first operation ends 321, 322 are located on two ends of the first link 32 and located on the movement tracks of the two protruding piston rods 113, 123. The two second operation ends 331, 332 are located on two ends of the second link 33, and located on the movement tracks of the two protruding piston rods 133, 143.

Figure 8:
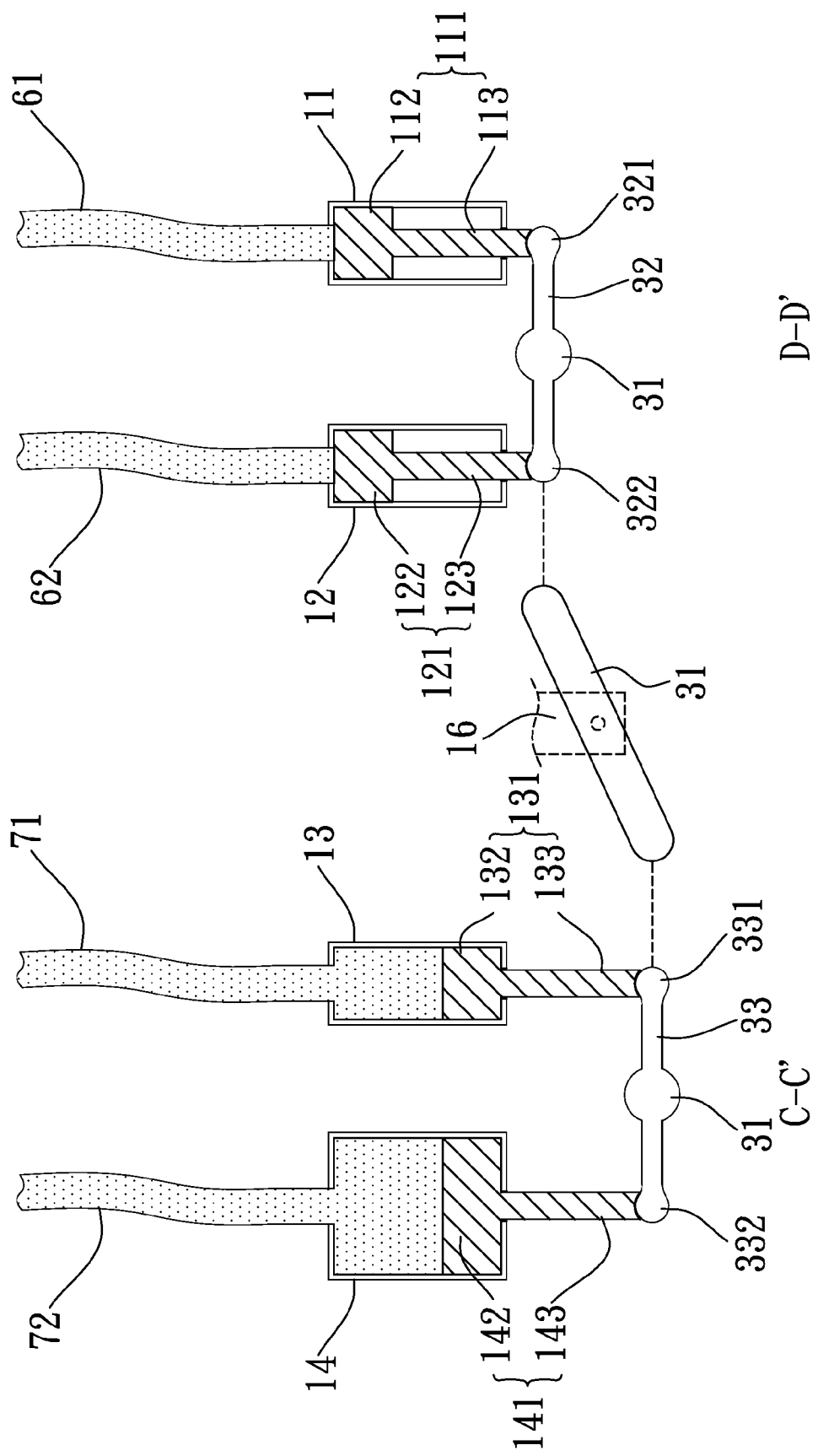
FIG. 8 is two cross sectional views respectively taking along lines C-C' and D-D' in FIG. 7, wherein no action is taken.
Figure 9:
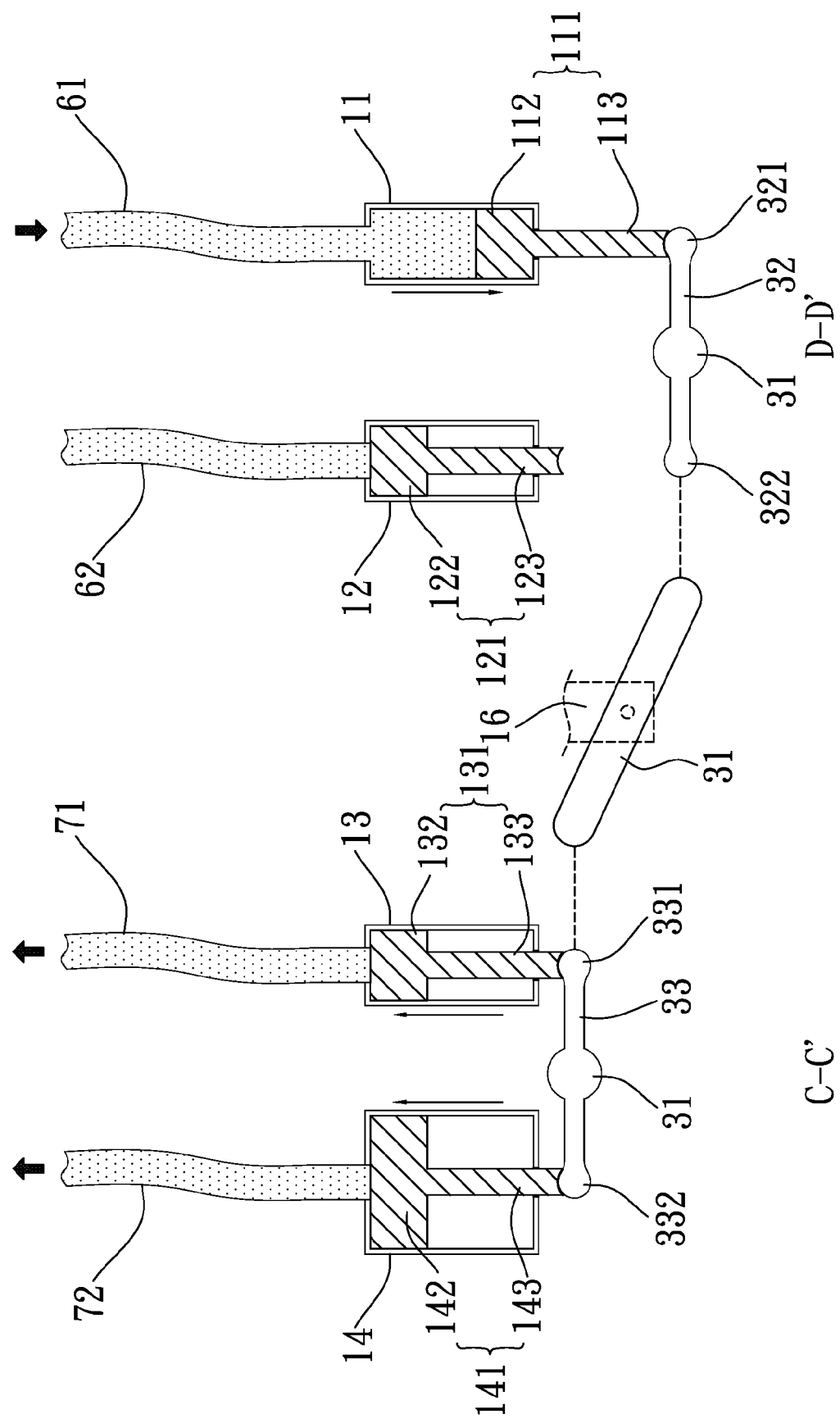
FIG. 9 is two cross sectional views respectively taking along lines C-C' and D-D' in FIG. 7, wherein the left brake lever is operated.
Figure 10:
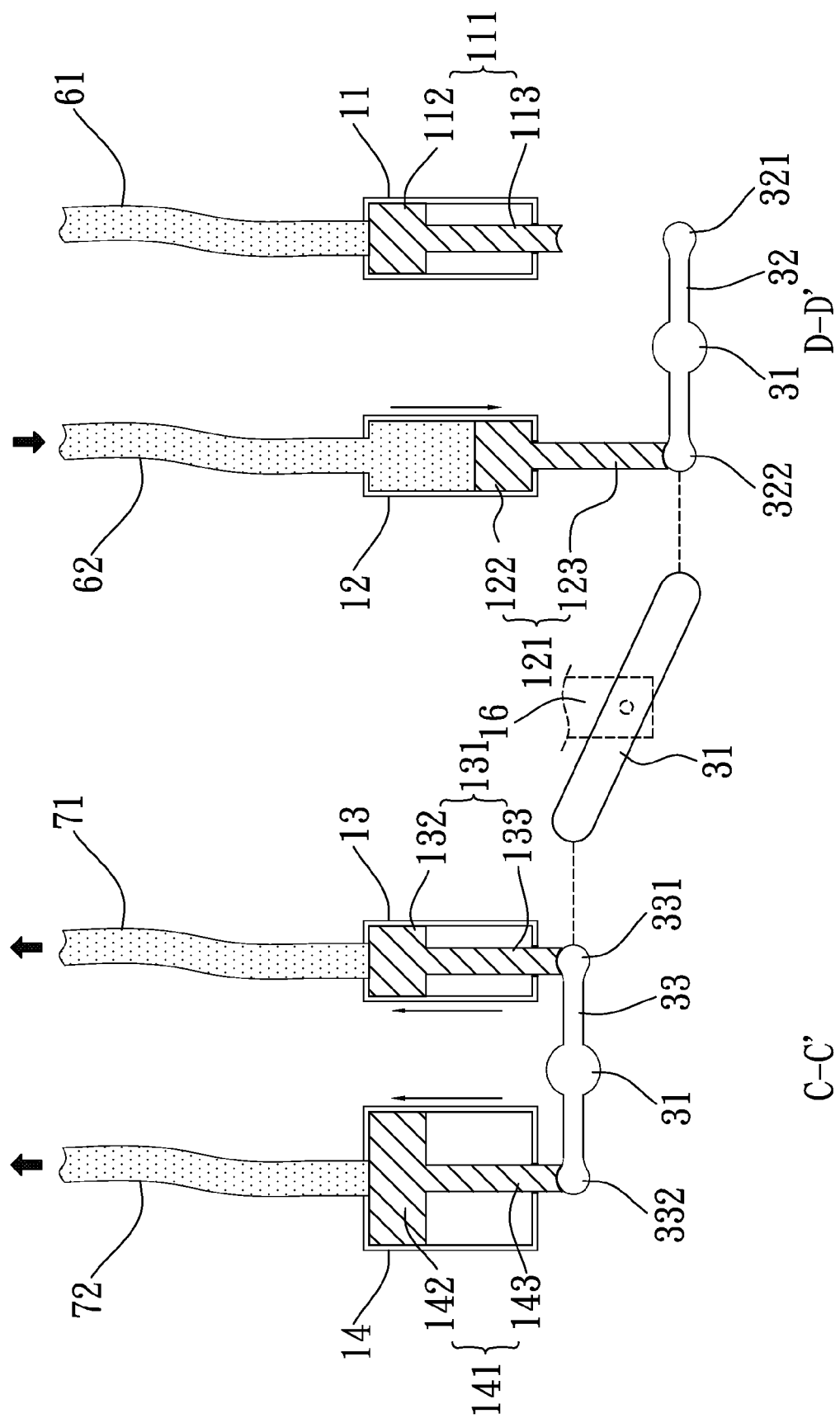
FIG. 10 is two cross sectional views respectively taking along lines C-C' and D-D' in FIG. 7, wherein the right brake lever is operated.

As shown in FIGS. 8 to 10, when no braking action is taken, as shown in FIG. 8, two first operation ends 321, 322 and the second operation ends 331, 332 respectively contact the pistons rods 113, 123, 133, 143. When only the left brake lever is pulled as shown in FIG. 9, the piston 112 and the piston rod 113 of the cylinder 11 are driven via the hydraulic power from the left brake lever hose 61, the first link 32 is pushed by the first operation end 321 and the first link 32 is moved downward, the positioning rod 31 is rotated about the connection portion 16 so that the second link 33 on the opposite side of the positioning rod 31 moves upward. The two second operation ends 331, 332 simultaneously push the piston rods 133, 143 and the two pistons 132, 142 so as to drive the front wheel brake unit and the rear wheel brake unit via the front and rear wheel brake hoses 71, 72. Similarly, when only the right brake lever is pulled as shown in FIG. 10, the piston 122 and the piston rod 123 of the cylinder 12 are driven via the hydraulic power from the right brake lever hose 62. The first link 32 is moved downward and the second link 33 on the other end of the positioning rod 31 is moved upward. The two second operation ends 331, 332 simultaneously push the piston rods 133, 143 and the two pistons 132, 142 so as to drive the front wheel brake unit and the rear wheel brake unit via the front and rear wheel brake hoses 71, 72.

In the previous two embodiments, the left and right brake lever hoses 61, 62 and the front and rear wheel brake hoses 71, 72 are connected to the same side of the body 10, by the cooperation of the transmission devices 20, 30 on the other side of the body 10, using the leverage principle, when the first operation ends 221(231), 321(322) is moved downward, the two second operation ends 222, 232, 331, 332 are moved upward by the positioning rods 21, 31 to achieve the safe braking action. The four hoses are connected to the same side of the body 10 and this is difficult when installed to the vehicle. The applicant further provides an improved arrangement as shown in FIGS. 11 to 15, the left and right brake lever hoses 61, 62 and the front and rear wheel brake hoses 71, 72 are respectively connected to the two opposite sides of the body 50, which is more convenient when in use.

Figure 11:
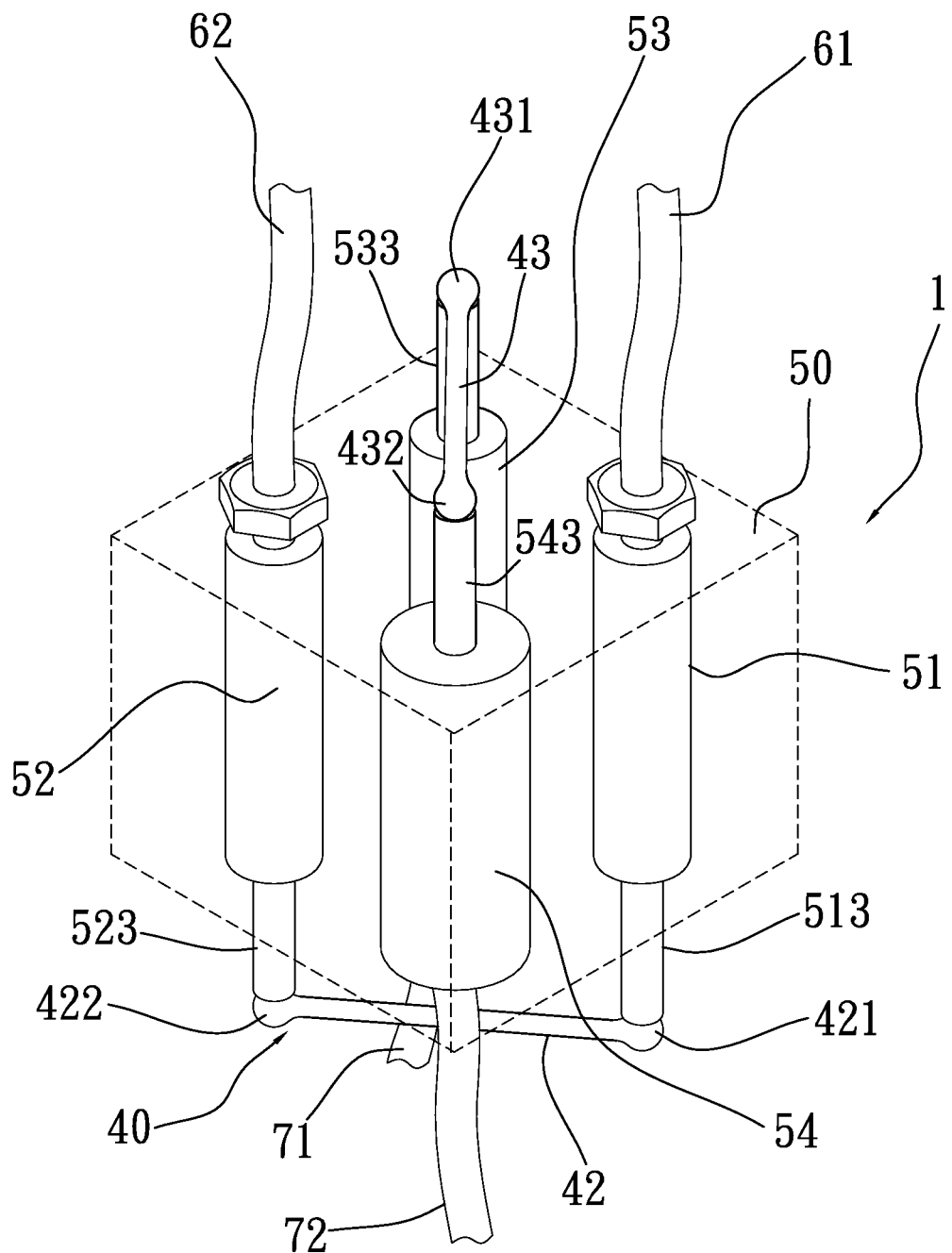
FIG. 11 shows the arrangement of the third embodiment of the auxiliary device of the present invention.
Figure 12:
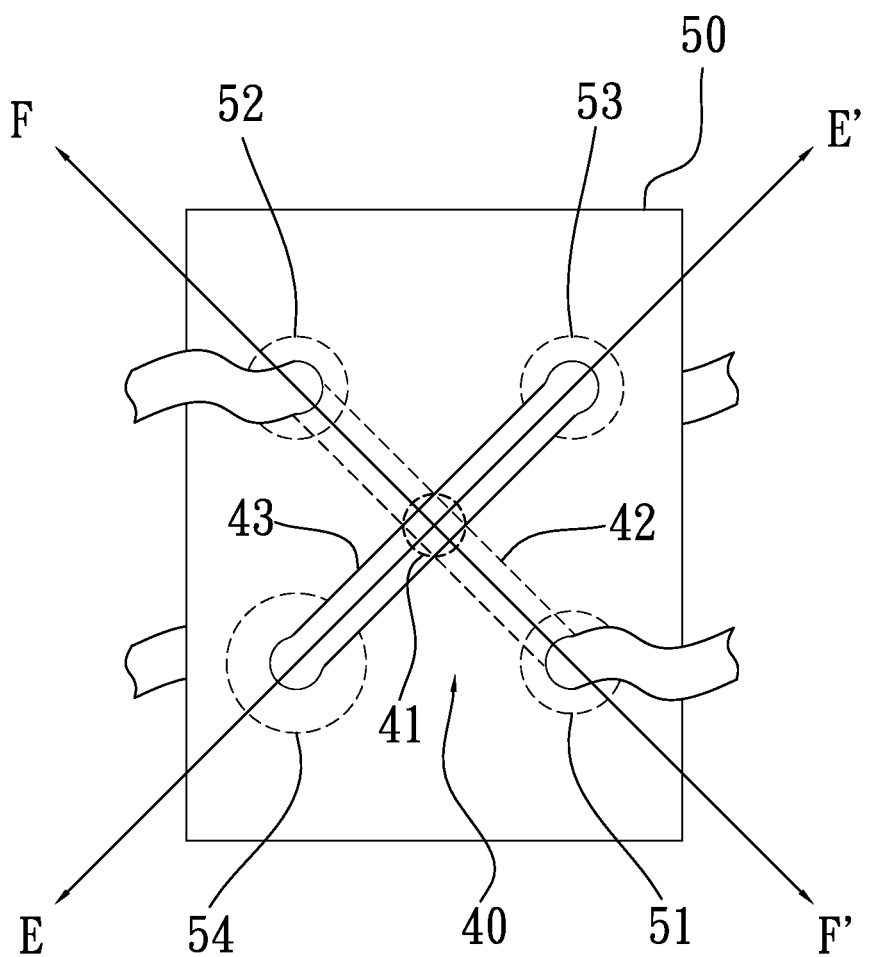
FIG. 12 is a top view to show the arrangement of the third embodiment of the auxiliary device of the present invention.
Figure 13:
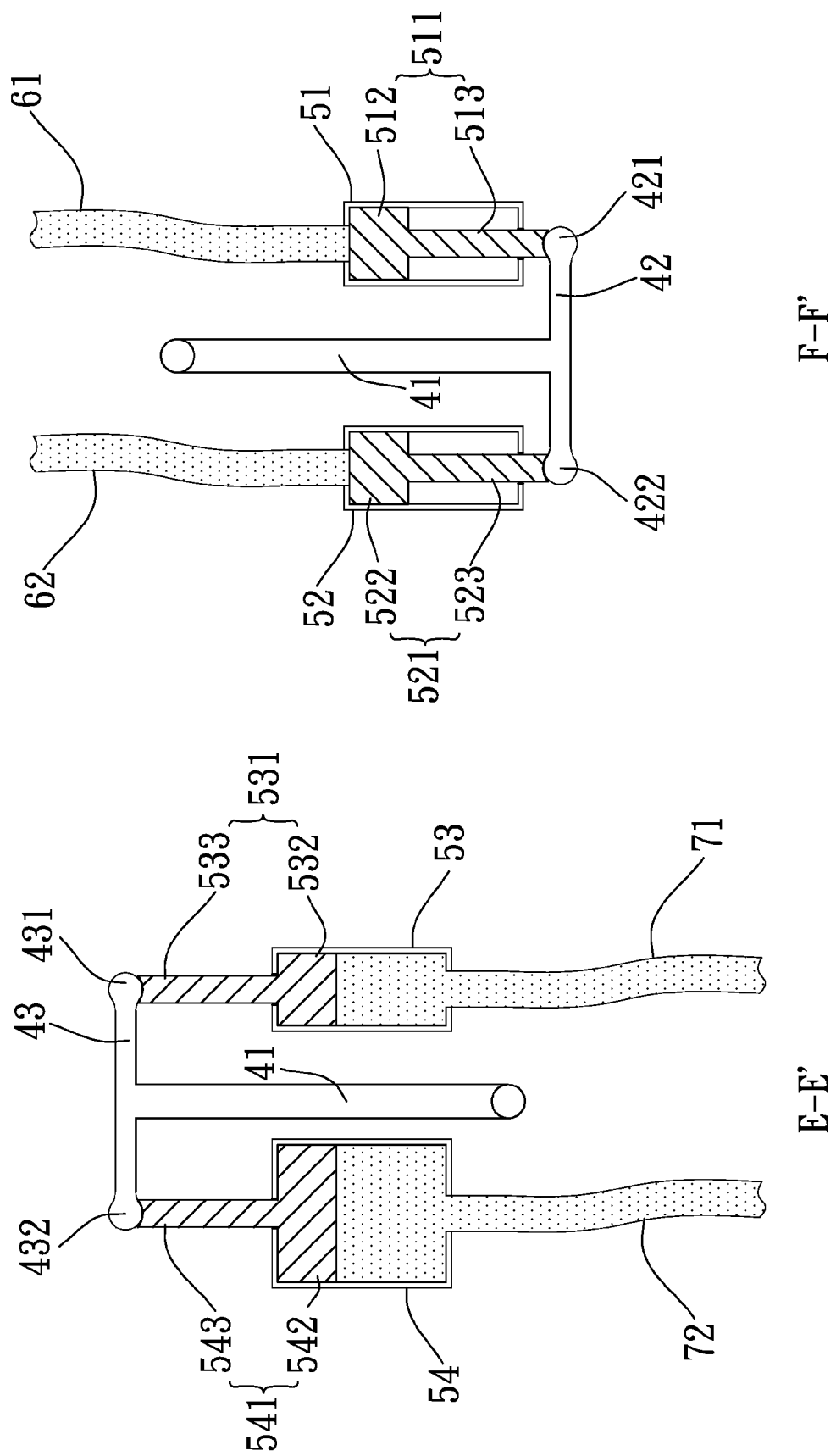
FIG. 13 is two cross sectional views respectively taking along lines E-E' and F-F' in FIG. 11, wherein no action is taken.

As shown in FIGS. 11 to 13, the third embodiment of the auxiliary device 1 of the present invention comprises a body 50 and a transmission device 40, wherein the body 50 is a rectangular body and has four cylinders 51, 52, 53, 54 located between the top and the bottom thereof. The two cylinders 51, 52 on the top of the body 50 are connected to the left and right brake lever hoses 61, 62, and the other two cylinders 53, 54 on the bottom of the body 50 are connected to the front and rear wheel brake hoses 71, 72. Each of the cylinders 51, 52, 53, 54 has a movable unit 511/521/531/541 which has a piston 512/522/532/542 and a piston rod 513/523/533/543. The piston 512/522/532/542 is movably located in the cylinder 51/52/53/54 corresponding thereto. The piston rod 513/523/533/543 is connected to the piston 512/522/532/542 correspondingly and protrudes beyond the cylinder 51/52/53/54 corresponding thereto and located in opposite to the hose. The piston rods 513, 523 of the cylinders 51, 52 that are connected to the left and right brake lever hoses 61, 62, extend beyond the bottom of the body 50. The piston rods 533, 543 of the cylinders 53, 54 that are connected to the front and rear wheel brake hoses 71, 72, extend beyond the top of the body 50.

The transmission device 40 of the embodiment has a positioning rod 41, a first link 42 and a second link 43. The positioning rod 41 extends through the body 50 and the two ends of the positioning rod 41 respectively extend beyond the top and bottom of the body 50. The two ends of the positioning rod 41 are respectively connected to the first and second links 42, 43. The two first operation ends 421, 422 are located on the two ends of the first link 42 and located on the movement tracks of the two protruding piston rods 513, 523. The two second operation ends 431, 432 are located on the two ends of the second link 43, and located on the movement tracks of the two protruding piston rods 533, 543.

Figure 14:
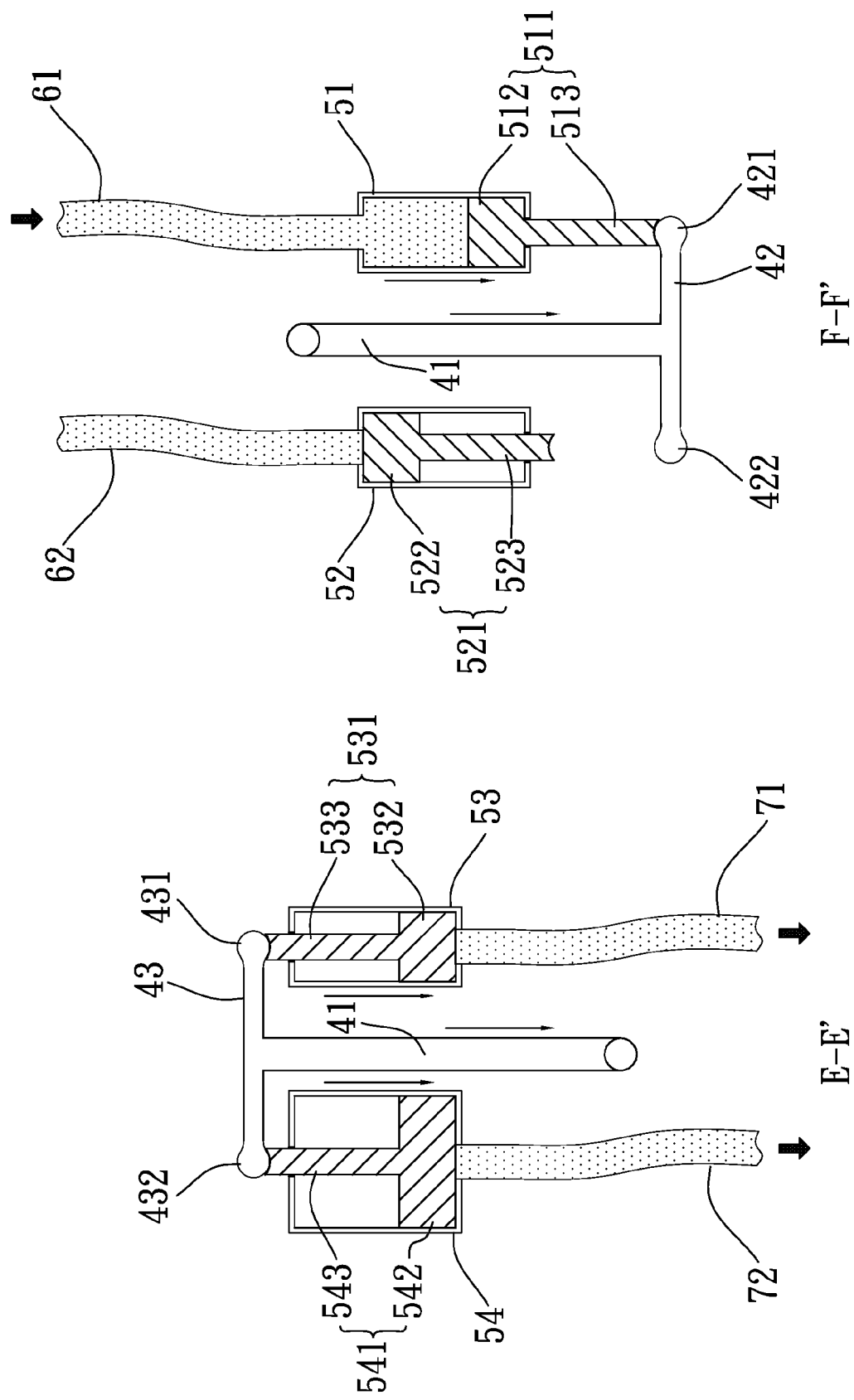
FIG. 14 is two cross sectional views respectively taking along lines E-E' and F-F' in FIG. 11, wherein the left brake lever is operated.
Figure 15:
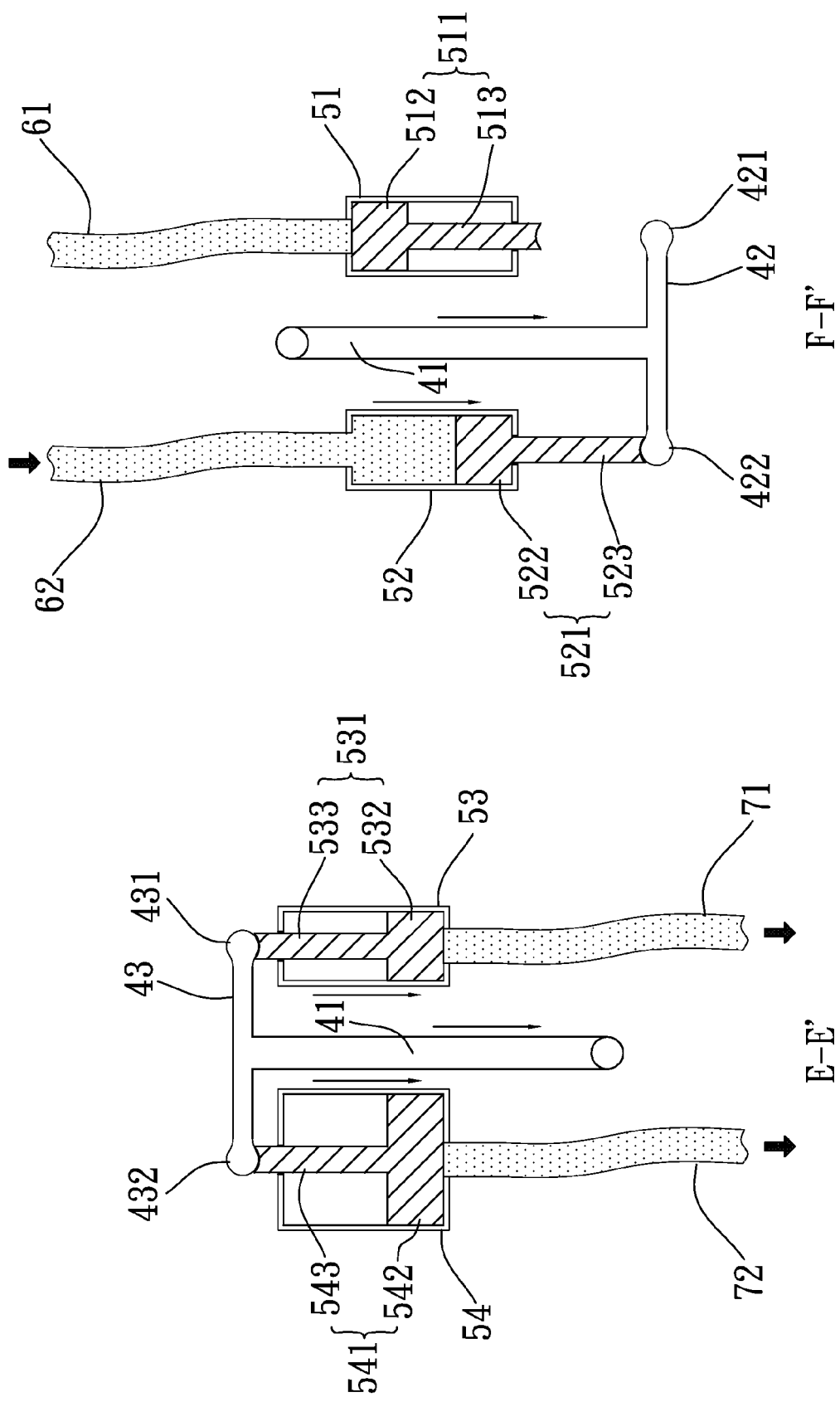
FIG. 15 is two cross sectional views respectively taking along lines E-E' and F-F' in FIG. 11, wherein the right brake lever is operated.

As shown in FIGS. 13 to 15, when no braking action is taken, as shown in FIG. 13, two first operation ends 421, 422 and the second operation ends 431, 432 respectively contact the piston rods 513, 523, 533, 543. When only the left brake lever is pulled as shown in FIG. 14, the piston 512 and the piston rod 513 of the cylinder 51 are driven via the hydraulic power from the left brake lever hose 61, the first link 42 is pushed by the first operation end 421 and the first link 42 is moved downward, the positioning rod 41 and the second link 43 are moved downward. The two second operation ends 431, 432 simultaneously push the piston rods 533, 543 and the two pistons 532, 542 so as to drive the front wheel brake unit and the rear wheel brake unit via the front and rear wheel brake hoses 71, 72. Similarly, when only the right brake lever is pulled as shown in FIG. 15, the piston 522 and the piston rod 523 of the cylinder 52 are driven via the hydraulic power from the right brake lever hose 62. The first link 42 is moved downward, and the positioning rod 41 and the second link 43 are moved downward. The two second operation ends 431, 432 simultaneously push the piston rods 533, 543 and the two pistons 532, 542 so as to drive the front wheel brake unit and the rear wheel brake unit via the front and rear wheel brake hoses 71, 72.

For each of the embodiments, the first operation ends 221, 231, 321, 322, 421, 422 are located in the cylinders 12, 11, 11, 12, 51, 52 which has limited amount or even no hydraulic oil when the brake lever is not pulled. In the cylinders 14, 13, 13, 14, 53, 54 corresponding to the second operation ends 222, 232, 331, 332, 431, 432, the hydraulic oil is full to have the best status for the braking actions.

For the auxiliary device 1 of the present invention, the front and wheel are braked by either pulling the left brake lever or the right brake lever. In detail, the front wheel brake unit and the rear wheel brake unit are simultaneously activated by pulling either the left brake lever or the right break lever. By using different sizes of the front wheel brake unit and the rear wheel brake unit, preferably, the front wheel is braked right after the rear wheel is braked. The braking force applied to the rear wheel is larger than that to the front wheel. In the embodiments, the diameters of the cylinders 14, 54 connected to the rear wheel brake hose 72 are larger than those of the diameters of the cylinders 13, 53 connected to the front wheel brake hose 71, this is helpful for the control to the vehicle when the rider brakes the vehicle.

While we have shown and described the embodiment in accordance with the present invention, it should be clear to those skilled in the art that further embodiments may be made without departing from the scope of the present invention.

What is claimed is:

1. An auxiliary device for a hydraulic brake assembly, comprising:
   a body having four cylinders located between a top and a bottom thereof, each of the four cylinders having a movable unit, each of the movable units having a first end located in the cylinder corresponding thereto and a second end protruding beyond a first end of the cylinder corresponding thereto, and each of the movable units movable relative to the cylinder corresponding thereto axially, each of the movable units having a piston and a piston rod, each piston movably located in the cylinder corresponding thereto, each piston rod having a first end connected to the piston;
   a transmission device disposed on the body and having two first operation ends and two second operation ends, the two first operation ends and the two second operation ends respectively located on movement tracks of the four movable units, a second end of each piston rod protruding beyond the first end of the cylinder and contacting one of the first operation ends or one of the second operation ends of the transmission device;
   a left brake lever hose and a right brake lever hose respectively connected to two respective second ends of the cylinders located corresponding to the two first operation ends, a front wheel brake hose and a rear wheel brake hose respectively connected to two respective second ends of the cylinders located corresponding to the two second operation ends, and when the movable unit drives one of the first operation ends located corresponding thereto, the two movable units located corresponding to the second operation ends are moved by the transmission device.

2. The device as claimed in claim 1, wherein a diameter of the cylinder connected to the rear wheel brake hose is larger than a diameter of the cylinder connected with the front wheel brake hose.

3. The device as claimed in claim 2, wherein the piston rods protruding from the cylinders are located on one side of the body, a connection portion is formed on the side of the body so as to be connected with the transmission device.

4. The device as claimed in claim 3, wherein the transmission device has a positioning rod, a first link and a second link, the positioning rod extends through the connection portion and is rotatable along an axis thereof, the first and second links respectively extend through the positioning rods, the two first operation ends are located on two respective first ends of the first and second links, the two second operation ends are located on two respective second ends of the first and second links.

5. The device as claimed in claim 3, wherein the transmission device has a positioning rod, a first link and a second link, a central portion of the positioning rod is connected to the connection portion, two ends of the positioning rod are rotatable about the connection portion, the first and second links are respectively connected to the two ends of the positioning rod, the two first operation ends are located on two ends of the first link, the two second operation ends are located on two ends of the second link.

6. The device as claimed in claim 2, wherein the piston rods that are located corresponding to the two first operation ends protrude from a first side of the body, the piston rods that are located corresponding to the two second operation ends protrude from a second side of the body, the transmission device extends through the body, and the two first operation ends and the two second operation ends are respectively located on two opposite sides of the body.

7. The device as claimed in claim 6, wherein the transmission device has a positioning rod, a first link and a second link, the positioning rod extends through the body, the first and second links are respectively connected to two ends of the positioning rods, the two first operation ends are located on two ends of the first link, the two second operation ends are located on two ends of the second link.

8. The device as claimed in claim 1, wherein a diameter of the cylinder connected to the rear wheel brake hose is larger than a diameter of the cylinder connected with the front wheel brake hose.

9. The device as claimed in claim 8, wherein the piston rods protruding from the cylinders are located on one side of the body, a connection portion is formed on the side of the body so as to be connected with the transmission device.

10. The device as claimed in claim 9, wherein the transmission device has a positioning rod, a first link and a second link, the positioning rod extends through the connection portion and is rotatable along an axis thereof, the first and second links respectively extend through the positioning rods, the two first operation ends are located on two respective first ends of the first and second links, the two second operation ends are located on two respective second ends of the first and second links.

11. The device as claimed in claim 9, wherein the transmission device has a positioning rod, a first link and a second link, a central portion of the positioning rod is connected to the connection portion, two ends of the positioning rod are rotatable about the connection portion, the first and second links are respectively connected to the two ends of the positioning rod, the two first operation ends are located on two ends of the first link, the two second operation ends are located on two ends of the second link.

12. The device as claimed in claim 8, wherein the piston rods that are located corresponding to the two first operation ends protrude from a first side of the body, the piston rods that are located corresponding to the two second operation ends protrude from a second side of the body, the transmission device extends through the body, and the two first operation ends and the two second operation ends are respectively located on two opposite sides of the body.

13. The device as claimed in claim 12, wherein the transmission device has a positioning rod, a first link and a second link, the positioning rod extends through the body, the first and second links are respectively connected to two ends of the positioning rods, the two first operation ends are located on two ends of the first link, the two second operation ends are located on two ends of the second link.

* * * * *